US012640640B2

(12) United States Patent
Sakurai et al.

(10) Patent No.: US 12,640,640 B2
(45) Date of Patent: May 26, 2026

(54) GATE DRIVE CIRCUIT AND POWER CONVERSION DEVICE

(71) Applicant: HITACHI ASTEMO, LTD., Hitachinaka (JP)

(72) Inventors: Naoki Sakurai, Hitachinaka (JP); Masahiro Doi, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 202 days.

(21) Appl. No.: 18/560,730

(22) PCT Filed: Feb. 21, 2022

(86) PCT No.: PCT/JP2022/007049
§ 371 (c)(1),
(2) Date: Nov. 14, 2023

(87) PCT Pub. No.: WO2022/244361
PCT Pub. Date: Nov. 24, 2022

(65) Prior Publication Data
US 2024/0258901 A1     Aug. 1, 2024

(30) Foreign Application Priority Data
May 21, 2021    (JP) ................................. 2021-086386

(51) Int. Cl.
*H02M 1/08*      (2006.01)
*H02M 1/00*      (2006.01)
(Continued)

(52) U.S. Cl.
CPC ........... *H02M 1/08* (2013.01); *H02M 1/0009* (2021.05); *H02M 1/32* (2013.01); *H02M 1/327* (2021.05); *H02M 7/537* (2013.01)

(58) Field of Classification Search
CPC ........ H02M 1/08; H02M 1/0009; H02M 1/32; H02M 1/327; H02M 1/0054; H02M 7/537; H02M 7/5387
See application file for complete search history.

(56) References Cited

U.S. PATENT DOCUMENTS 10,505,538 B1*   12/2019   Alam ................... H03K 17/168
2001/0002782 A1*   6/2001   Shimane ................ B60L 50/51
                                            318/282
(Continued)

FOREIGN PATENT DOCUMENTS

JP     H05-328746 A    12/1993
JP     2001-169407 A    6/2001
(Continued)

OTHER PUBLICATIONS

International Search Report with English Translation and Written Opinion dated May 17, 2022 in corresponding International Patent Application No. PCT/JP2022/007049 (9 pages).

*Primary Examiner* — Jue Zhang
*Assistant Examiner* — Jye-June Lee
(74) *Attorney, Agent, or Firm* — Foley & Lardner LLP

(57) ABSTRACT

A gate drive circuit is connected to a semiconductor element having a gate terminal via a gate resistor and changes a gate voltage applied to the gate terminal to drive the semiconductor element, and when a condition that a current flowing through the semiconductor element is equal to or greater than a predetermined first threshold value and equal to or less than a predetermined second threshold value greater than the first threshold value and a temperature of the semiconductor element is equal to or greater than a predetermined third threshold value and equal to or less than a predetermined fourth threshold value greater than the third threshold value is satisfied, a resistance value of the gate (Continued)

resistor when the semiconductor element is turned on is switched to a value greater than that when the condition is not satisfied.

6 Claims, 7 Drawing Sheets

(51) Int. Cl.
 _H02M 1/32_ (2007.01)
 _H02M 7/537_ (2006.01)

(56) References Cited

U.S. PATENT DOCUMENTS

| | | | | |
|---|---|---|---|---|
| 2004/0178759 A1* | 9/2004 | Nakamura | ......... | B60H 1/00428 |
| | | | | 318/471 |
| 2004/0196678 A1* | 10/2004 | Yoshimura | .......... | H02M 7/5387 |
| | | | | 363/79 |
| 2016/0211767 A1 | 7/2016 | Hotta | | |
| 2023/0179196 A1 | 6/2023 | Yamamoto et al. | | |

FOREIGN PATENT DOCUMENTS

| | | | | |
|---|---|---|---|---|
| JP | 2003-274672 A | | 9/2003 |
| JP | 3820167 B2 | | 9/2006 |
| JP | 2014023312 A | * | 2/2014 |
| JP | 2015-065742 A | | 4/2015 |
| WO | WO-2021/245719 A1 | | 12/2021 |

* cited by examiner (a)

(b)

(a)

(b)

GATE DRIVE CIRCUIT AND POWER CONVERSION DEVICE

TECHNICAL FIELD

The present invention relates to a gate drive circuit and a power conversion device.

BACKGROUND ART

Conventionally, in the control of a driving motor of a railway vehicle, an electric vehicle, or the like, an inverter that converts DC power into AC power by a plurality of switching elements is widely used for energy saving and noise reduction. In such an inverter, a semiconductor element is generally used as a switching element, and in particular, in recent years, an insulated gate bipolar transistor (IGBT) has been adopted according to the low prices thereof. An IGBT is a voltage-driven switching element, and can turn on and off a current by turning on and off a voltage applied to a gate using a gate drive circuit.

When a current flowing through an induction load such as a motor is controlled using an IGBT, a surge voltage or noise is generated during a switching operation of the IGBT due to a parasitic inductance between the power supply and the IGBT. In order to suppress surge voltage and noise, generally a gate resistance connected to the gate of the IGBT may be increased. However, when the gate resistance increases, the switching loss increases, and there is a problem that problems such as an increase in power consumption and heat generation occur.

As a technique for solving the above problem, for example, PTL 1 is known. PTL 1 discloses a semiconductor switching device that reduces noise generation by increasing a gate resistance value of a switching element when a load current is equal to or less than a predetermined value, and suppresses surge voltage and noise by decreasing the gate resistance value when the load current exceeds the predetermined value and when a temperature of the semiconductor switching element exceeds a predetermined temperature.

CITATION LIST

Patent Literature

PTL 1: Japanese Patent No. 3820167

SUMMARY OF INVENTION

Technical Problem

In general, a device such as an inverter using an IGBT as a switching element has an upper and lower arm circuit configured by connecting two arms, in which diodes are connected in anti-parallel to the IGBT, in series for each phase of an AC output current. In this upper and lower arm circuit, when the IGBT of one arm is turned on according to a change in the gate voltage, the diode of the other arm forming a pair performs a recovery operation. At this time, a surge voltage called a recovery surge is generated in the diode due to a parasitic inductance between the DC power supply and the diode. The magnitude of the recovery surge changes according to the load current and the temperature, and has a peak at a certain current value and temperature. Therefore, as in the semiconductor switching device disclosed in PTL 1, even when the gate resistance value is switched to a small value when the load current and the temperature exceed predetermined values, the surge voltage cannot be sufficiently suppressed depending on the load current and the temperature, and noise and switching loss may occur.

In view of the above problems, an object of the present invention is to provide a gate drive circuit and a power conversion device capable of sufficiently suppressing noise and switching loss generated in a semiconductor element.

Solution to Problem

According to the present invention, a gate drive circuit is connected to a semiconductor element having a gate terminal via a gate resistor and changes a gate voltage applied to the gate terminal to drive the semiconductor element, and when a condition that a current flowing through the semiconductor element is equal to or greater than a predetermined first threshold value and equal to or less than a predetermined second threshold value greater than the first threshold value and a temperature of the semiconductor element is equal to or greater than a predetermined third threshold value and equal to or less than a predetermined fourth threshold value greater than the third threshold value is satisfied, a resistance value of the gate resistor when the semiconductor element is turned on is switched to a value greater than that when the condition is not satisfied.

According to the present invention, a power conversion device includes: the gate drive circuit; and an inverter that includes the semiconductor element and converts DC power supplied from a DC power supply into AC power using the semiconductor element.

Advantageous Effects of Invention

According to the present invention, it is possible to provide a gate drive circuit and a power conversion device capable of sufficiently suppressing noise and switching loss generated in a semiconductor element.

DESCRIPTION OF EMBODIMENTS

Hereinafter, embodiments will be described with reference to the drawings. The following description and drawings are examples for describing the present invention, and are omitted and simplified as appropriate for the sake of clarity of description. The present invention can be carried out in various other forms. Unless otherwise specified, each component may be singular or plural.

Hereinafter, the principle of the present invention will be described with reference to FIGS. 1 to 5.

Figure 1:
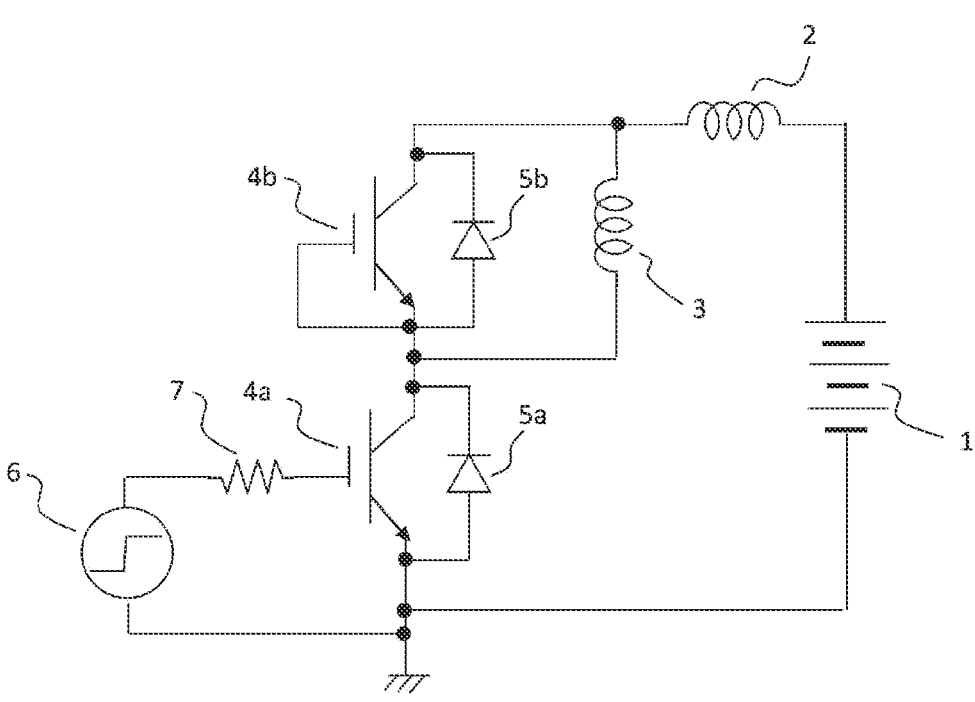
FIG. 1 is a diagram illustrating an example of a circuit for evaluating recovery characteristics of a diode.

FIG. 1 is a diagram illustrating an example of a circuit for evaluating recovery characteristics of a diode. The circuit illustrated in FIG. 1 includes a DC power supply 1, a wiring parasitic inductance 2, a load inductance 3, IGBTs 4a and 4b, diodes 5a and 5b, a pulse generator 6, and a gate resistor 7. The circuit illustrated in FIG. 1 is an equivalent circuit of a motor drive system in which an AC motor and an inverter are combined, and the load inductance 3 corresponds to a winding of the AC motor, and the IGBTs 4a and 4b and the diodes 5a and 5b correspond to one phase of the inverter, respectively. The pulse generator 6 corresponds to a drive circuit that drives the IGBT 4a.

In the circuit of FIG. 1, the IGBT 4a and the diode 5a, and the IGBT 4b and the diode 5b are connected in anti-parallel, and are connected in series between the high potential side and the low potential side of the DC power supply 1. The IGBT 4a and the diode 5a form a lower arm, and the IGBT 4b and the diode 5b form an upper arm of the inverter. As a result, upper and lower arm circuit for one phase of the inverter is formed. The pulse generator 6 is connected to a gate terminal of the IGBT 4a of the lower arm via the gate resistor 7.

The collector of the IGBT 4a of the lower arm is connected to the emitter of the IGBT 4b of the upper arm. A load inductance 3 is connected therebetween. The high potential side of the DC power supply 1 is connected to the collector of the IGBT 4b, and the low potential side of the DC power supply 1 is connected to the emitter side of the IGBT 4a. In FIG. 1, the parasitic inductance in the wiring between the IGBT 4b and the DC power supply 1 is illustrated as the wiring parasitic inductance 2.

In the circuit of FIG. 1, when the pulse generator 6 generates the ON signal, the gate voltage of the IGBT 4a rises and the IGBT 4a is turned on. At this time, a current flows from the DC power supply 1 to the IGBT 4a through the load inductance 3. Thereafter, when the pulse generator 6 generates an off signal, the gate voltage of the IGBT 4a decreases, and the IGBT 4a is turned off. At this time, the current flowing through the IGBT 4a so far flows back through the load inductance 3 and the diode 5b.

Figure 2:
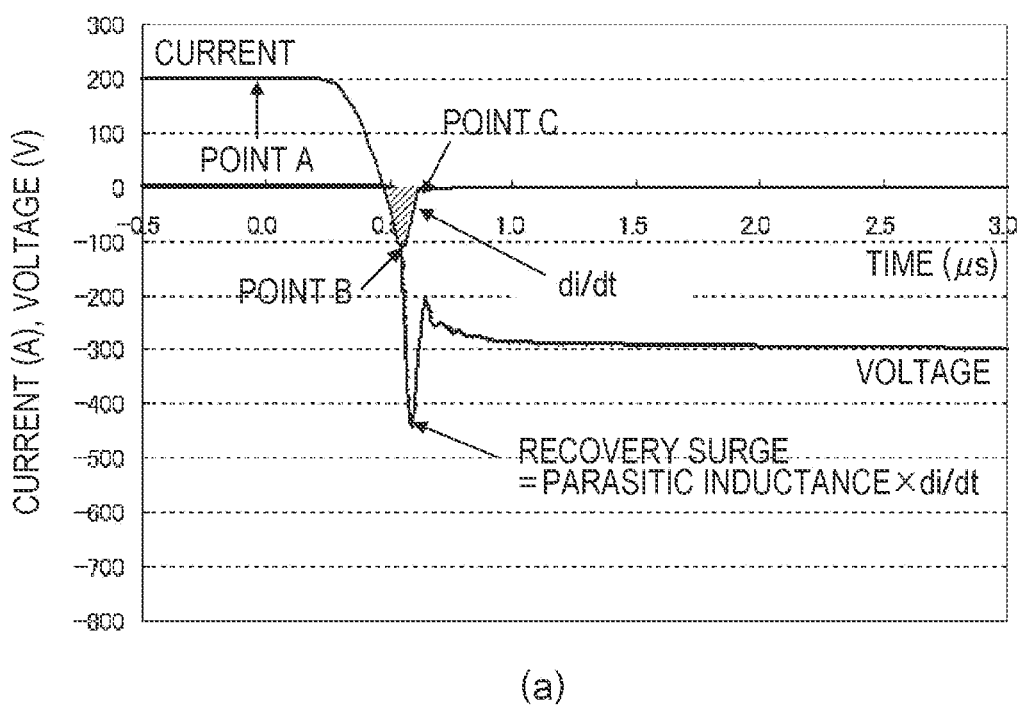
FIG. 2 is a diagram for explaining changes in current and voltage of the diode.
Figure 2:
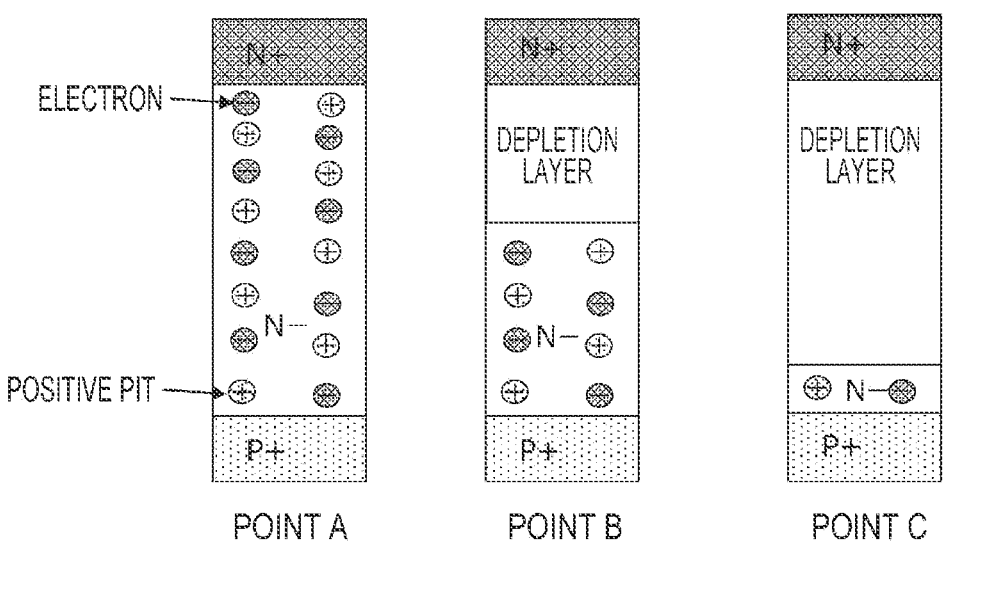

FIG. 2 is a diagram for explaining changes in current and voltage of the diode 5b when the IGBT 4a is turned on while current is flowing through the diode 5b in the circuit of FIG. 1. FIG. 2(a) illustrates a current waveform and a voltage waveform of the diode 5b, and FIG. 2(b) is a schematic diagram illustrating a state of a change in carrier distribution in the diode 5b.

FIG. 2(b) illustrates carrier distributions at a point A, a point B, and a point C in the current waveform of FIG. 2(a). At the point A, the IGBT 4a is in the off state, and the reflux current is steadily flowing through the diode 5b. At this time, as illustrated in FIG. 2(b), in the diode 5b, electrons and pits (carriers) increase due to injection from the pn junction in the low-concentration N-layer, and the diode 5b enters a low resistance state.

When the IGBT 4a is switched from off to on, a reverse voltage is applied to the diode 5b, and the current flowing through the diode 5b decreases, as illustrated in FIG. 2(a). When a reverse bias is applied between the anode and the cathode of the diode 5b as described above, carriers accumulated in the diode 5b are discharged, and thus a recovery current flows in a direction opposite to a normal direction in the diode 5b (so-called recovery state). The point B indicates the peak point of the recovery current, and the carrier distribution of the diode 5b at the point B is in a state where the depletion layer extends to the middle of the N-layer as illustrated in FIG. 2(b). As the carriers accumulated in the N-layer decrease, the recovery current flowing through the diode 5b decreases.

In the circuit of FIG. 1, a surge voltage due to the recovery current is generated between the anode and the cathode while the recovery current flows through the diode 5b. This surge voltage is represented by the product (L×di/dt) of the temporal change di/dt in the magnitude of the recovery current and an inductance value L of the wiring parasitic inductance 2.

The point C indicates a point at which the recovery current becomes 0. At this time, in the diode 5b, as illustrated in FIG. 2(c), carriers accumulated in the N-layer disappear, and accordingly, the recovery current becomes 0.

Figure 3:
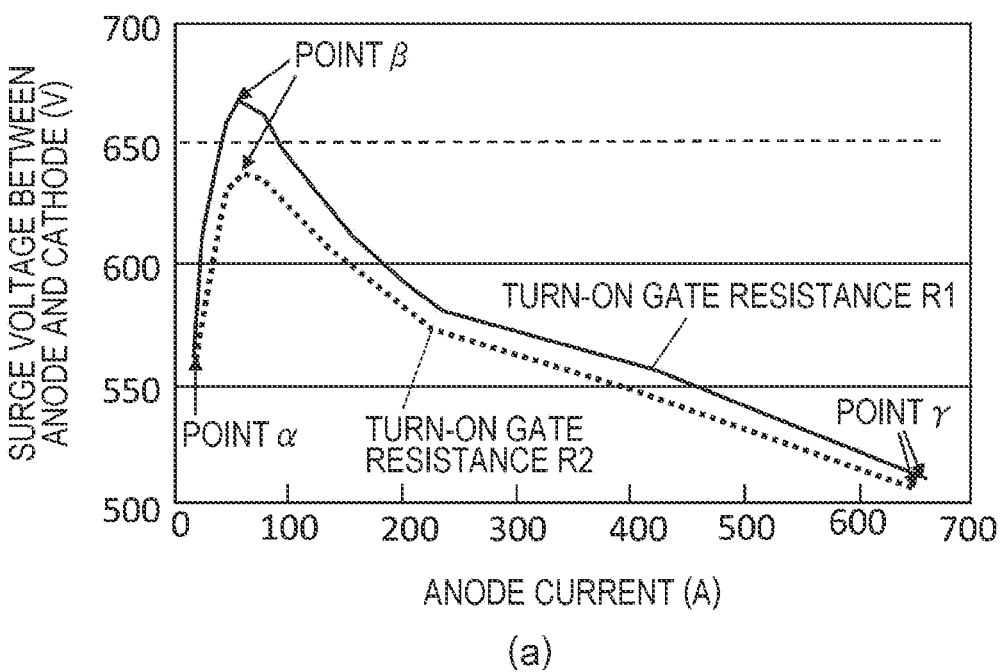
FIG. 3 is a diagram illustrating an example of current dependence of a surge voltage.
Figure 3:
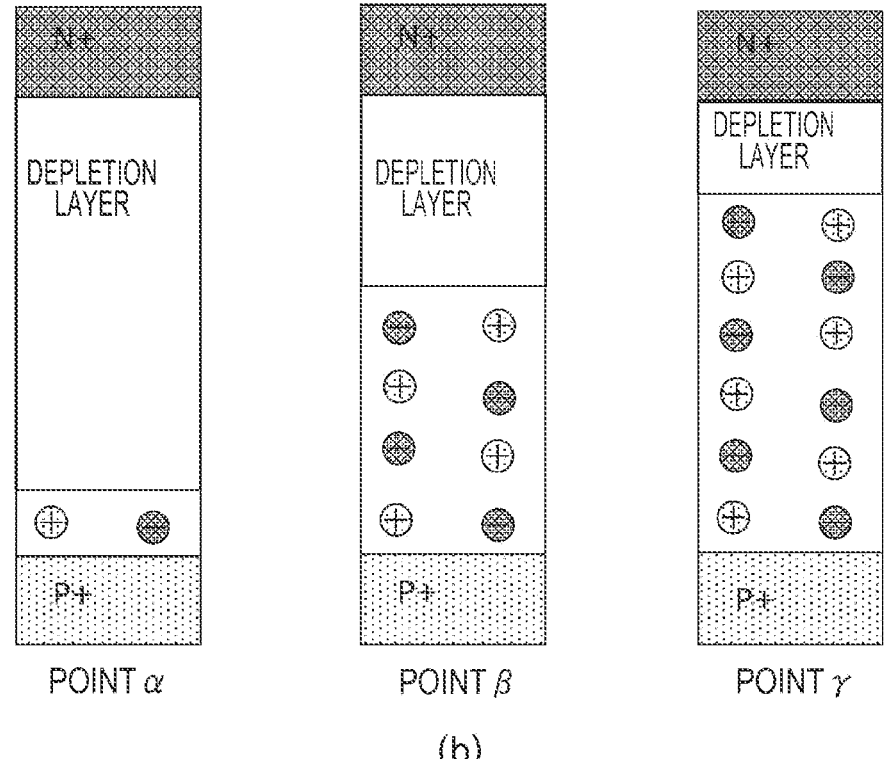

FIG. 3 is a diagram illustrating an example of current dependence of a surge voltage in the diode 5b. FIG. 3(a) illustrates the relationship between the magnitude of the anode current flowing through the diode 5b in the steady state illustrated at the point A in FIG. 2(a) and the magnitude of the surge voltage generated between the anode and the cathode of the diode 5b when the IGBT 4a is subsequently switched from off to on. Here, a solid line and a broken line in FIG. 3(a) indicate the current dependence of the surge voltage when the gate resistance values at the time of turn-on are R1 and R2, respectively, and R1<R2.

As illustrated in FIG. 3(a), the surge voltage at the time of recovery has a peak at a certain current between the minimum value and the maximum value of the current flowing through the diode 5b. The reason will be described below.

In each graph of FIG. 3(a), a point on the small current side is defined as a point α, a peak point of the surge voltage is defined as a point β, and a point on the large current side is defined as a point γ, respectively. FIG. 3(b) is a schematic carrier distribution diagram of the diode 5b at each of these points.

At the point α on the small current side, the current flowing through the diode 5b is small, and as illustrated in FIG. 3(b), the amount of carriers accumulated in the diode 5b is small. Therefore, the temporal change di/dt of the recovery current decreases, and the jump voltage at turn-on is small. On the other hand, the point γ on the large current side, the current flowing through the diode 5b is large, and as illustrated in FIG. 3(b), the amount of carriers accumulated in the diode 5b is large. Therefore, the depletion layer hardly extends at the time of turn-on, and the time for which the recovery current flows becomes long, and accordingly, the temporal change di/dt becomes small. Therefore, the temporal change di/dt is maximized not at either the point α or the point γ but at the point corresponding to a certain current value between the point β a and the point γ. That is, the amount of carriers accumulated in the diode 5b in a normal state satisfies point α<point β<point γ, the time during which carriers are discharged from the N-layer during recovery is set to point α>point β>point γ. As a result, the temporal change di/dt of the recovery current becomes maximum at the point β.

For example, assuming that the rated voltage of the diode 5b is 650 V, when the gate resistance value at the time of turn-on is R1, a current region in which the surge voltage exceeds the rated voltage is generated in the vicinity of the point β as indicated by the solid line in FIG. 3(a). On the other hand, when the gate resistance value at turn-on is R2, as indicated by the broken line in FIG. 3(a), surge voltage<rated current is satisfied in the entire current region between the point α and the point γ. That is, in order to reduce the surge voltage, the gate resistance value may be increased as much as possible.

Figure 4:
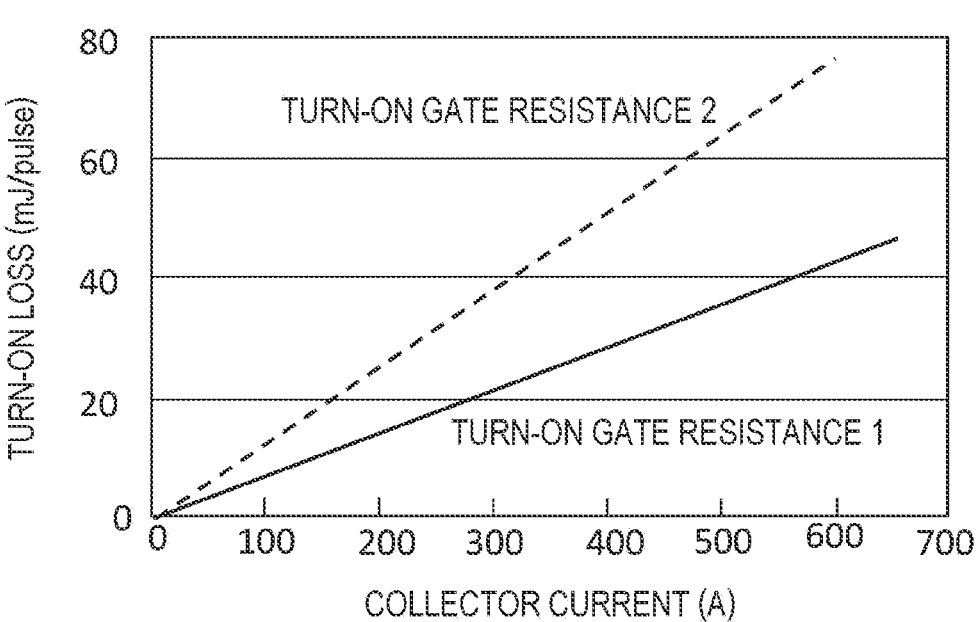
FIG. 4 is a diagram illustrating an example of collector current dependence of a turn-on loss.

FIG. 4 is a diagram illustrating an example of collector current dependence of a turn-on loss of the IGBT 4a. FIG. 4 shows the relationship between the magnitude of the collector current flowing when the IGBT 4a is turned on and the loss at the time of turn-on. Here, similarly to FIG. 3(a), a solid line and a broken line in FIG. 4 indicate the collector current dependence of the turn-on loss when the gate resistance values at the time of turn-on are R1 and R2, respectively, and R1<R2.

As illustrated in FIG. 4, as the collector current increases, the turn-on loss increases. In addition, since the turn-on of the IGBT 4a becomes slower as the gate resistance value increases, when the turn-on losses of the IGBT 4a at the gate resistances R1 and R2 are L1 and L2, respectively, L1<L2 is satisfied in the entire collector current region.

Figure 5:
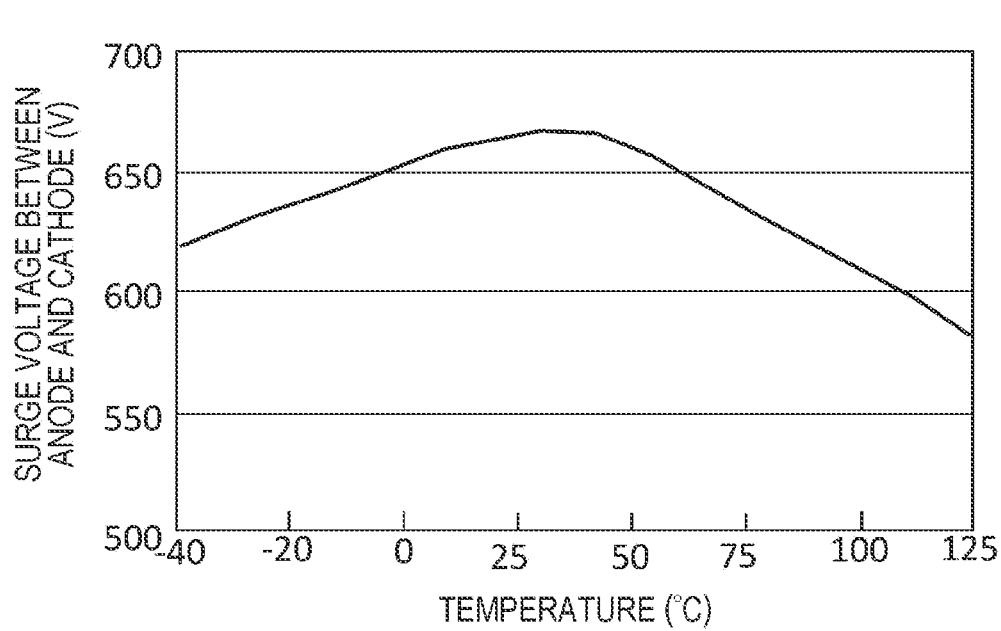
FIG. 5 is a diagram illustrating an example of temperature dependence of a surge voltage.

FIG. 5 is a diagram illustrating an example of temperature dependence of a surge voltage in the diode 5b. FIG. 4 shows the relationship between the temperature of the diode 5b and the magnitude of the surge voltage generated between the anode and the cathode of the diode 5b when the IGBT 4a is switched from off to on. As illustrated in FIG. 5, the surge voltage at the time of recovery has a peak at a certain temperature between the minimum value and the maximum value of the temperature range in which the diode 5b is used. The reason for this will be described below.

On the low temperature side, the number of pits injected from the anode becomes small, and the number of carriers accumulated in the diode 5b becomes small. Therefore, the temporal change di/dt of the recovery current decreases, and the jump voltage at turn-on is small. On the other hand, on the high temperature side, the number of pits injected from the anode becomes large, and the number of carriers accumulated in the diode 5b becomes small. Therefore, the depletion layer hardly extends at the time of turn-on, and the time for which the recovery current flows becomes long, and accordingly, the temporal change di/dt becomes small. Therefore, the temperature at which the temporal change di/dt is maximized is not either the minimum temperature or the maximum temperature, but is a certain temperature therebetween.

As described above, in the upper and lower arm circuits in which the IGBT and the diode driven according to the change in the gate voltage are connected in anti-parallel, when one arm is turned on, the surge voltage generated between the anode and the cathode of the diode of the other arm has peaks at a certain current and temperature. In consideration of such surge voltage characteristics of the upper and lower arm circuits, the present invention provides a gate drive circuit capable of sufficiently suppressing the surge voltage of the diode of one arm, which occurs when the IGBT of one arm is turned on, and sufficiently suppressing the turn-on loss of the IGBT over the entire region of the current and temperature of the diode.

Next, an embodiment of the present invention will be described with reference to FIGS. 6 to 8.

Figure 6:
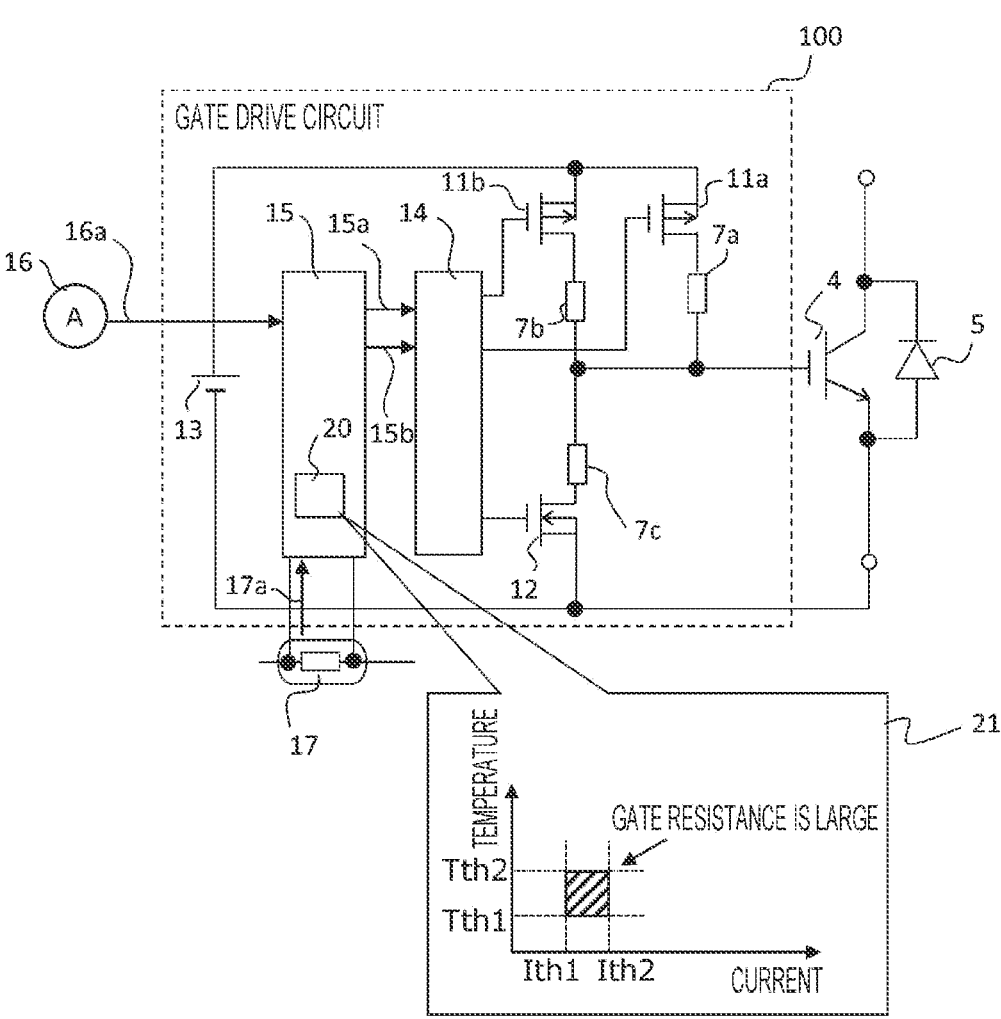
FIG. 6 is a diagram illustrating a configuration of a gate drive circuit according to an embodiment of the present invention.

FIG. 6 is a diagram illustrating a configuration of a gate drive circuit according to the embodiment of the present invention. A gate drive circuit 100 illustrated in FIG. 6 is connected to the IGBT 4 and changes a gate voltage applied to a gate terminal of the IGBT 4 to drive the IGBT 4. A diode 5 is connected in anti-parallel to the IGBT 4, and these diodes form an arm.

Although only the configuration of the gate drive circuit 100 for one arm is illustrated in FIG. 6, in the case of application to an inverter having a plurality of arms, the gate drive circuit 100 similar to that in FIG. 6 is connected to each arm. For example, in the case of an inverter that converts DC power into three-phase AC power using upper and lower arm circuits for three phases and outputs the three-phase AC power to a three-phase AC motor, a gate drive circuit 100 as illustrated in FIG. 6 is provided for each of the six arms of the inverter. However, as for the microcomputer 15, one microcomputer 15 may be shared by six arms.

The gate drive circuit 100 includes gate resistors 7a, 7b, and 7c, p-channel metal oxide semiconductor field effect transistors 11a and 11b, an n-channel MOSFET 12, a gate power supply 13, a driver IC 14, and the microcomputer 15.

Each of the gate resistors 7a, 7b, and 7c is connected to the gate terminal of the IGBT 4. The gate resistor 7a and the gate resistor 7b are connected in parallel to each other between the positive electrode side of the gate power supply 13 and the gate terminal of the IGBT 4, and the gate resistor 7c is connected between the negative electrode side of the gate power supply 13 and the gate terminal of the IGBT 4. Each of the p-channel MOSFETs 11a and 11b and the n-channel MOSFET 12 is connected between the gate power supply 13 and the gate resistors 7a, 7b and 7c, respectively, and the connection state between the gate power supply 13 and each gate resistor is switched by switching on and off states of these MOSFETs by the driver IC 14.

The microcomputer 15 acquires current information 16a output from a current sensor 16 and temperature information 17a output from a temperature sensor 17. The current sensor 16 is installed on an output wiring from the IGBT 4 to a load such as an AC motor, for example, and the current information 16a output from the current sensor 16 indicates the magnitude of a current that passes between a collector and an emitter of the IGBT 4 and is output to the load. An output signal from the sense emitter terminal of the IGBT 4 may be used as the current information 16a. In addition, the temperature sensor 17 is installed around the IGBT 4, for example, on a semiconductor chip of the IGBT 4 or on a power module on which the IGBT 4 is mounted, and the temperature information 17a output from the temperature sensor 17 indicates the temperature of the IGBT 4. The temperature of the cooling water for cooling the power module including the IGBT 4 may be used as the temperature information 17a.

The microcomputer 15 generates a PWM signal 15a based on a control command (for example, a torque command) or the like input from a host control device (not illustrated) and outputs the PWM signal 15a to the driver IC 14. The driver IC 14 changes the voltages of each gate terminal of the p-channel MOSFETs 11a and 11b and the n-channel MOSFET 12 according to the PWM signal 15a from the microcomputer 15, thereby controlling the on/off state of each MOSFET. At this time, the driver IC 14 changes the voltage of each gate terminal to turn on only one or both of the p-channel MOSFETs 11a and 11b based on a gate resistance switching signal 15b output from the microcomputer 15 together with the PWM signal 15a.

When one or both of the p-channel MOSFETs 11a and 11b are turned on, a voltage is applied from the gate power supply 13 to the gate terminal of the IGBT 4 via the gate resistors 7a and 7b, and the IGBT 4 is turned on. At this time, the n-channel MOSFET 12 is turned off. On the other hand, when both the p-channel MOSFETs 11a and 11b are turned off and the n-channel MOSFET 12 is turned on, the charge accumulated in the gate of the IGBT 4 is discharged, and the IGBT 4 is turned off.

The microcomputer 15 includes, inside or outside thereof, a memory 20 in which a map 21 that is information indicating a switching condition for the p-channel MOS-FETS 11a and 11b and the n-channel MOSFET 12 is stored. For example, as illustrated in FIG. 6, the map 21 represents threshold values Ith1 and Ith2 (Ith1<Ith2) for the current and threshold values Tth1 and Tth2 (Tth1<Tth2) for the temperature. The microcomputer 15 executes the processing illustrated in FIG. 7 based on the threshold values Ith1, Ith2, Tth1, and Tth2 indicated by the map 21 and the current information 16a and the temperature information 17a to generate and output the gate resistance switching signal 15b to the driver IC 14.

The threshold values Ith1 and Ith2 and the threshold values Tth1 and Tth2 are set corresponding to the peak part of the current dependence of the surge voltage illustrated in FIG. 3(a) and the peak part of the temperature dependence of the surge voltage illustrated in FIG. 5, respectively. That is, these threshold values are set such that the peak part of the current dependence of the surge voltage of the diode 5 exists between Ith1 and Ith2, and the peak part of the temperature dependence of the surge voltage of the diode 5 exists between Tth1 and Tth2.

Here, the magnitude of the reflux current flowing through the diode 5 in the steady state is determined according to the magnitude of the current flowing from the IGBT 4 to the load. Therefore, the current dependence of the surge voltage illustrated in FIG. 3(a) can be applied by using the current value between the collector and the emitter of the IGBT 4 indicated by the current information 16a instead of the current value of the reflux current flowing through the diode 5. The IGBT 4 and the diode 5 are usually formed on the same semiconductor chip. Therefore, the temperature of the IGBT 4 indicated by the temperature information 17a can be used instead of the temperature of the diode 5, and the temperature dependence of the surge voltage illustrated in FIG. 5 can be applied.

Figure 7:
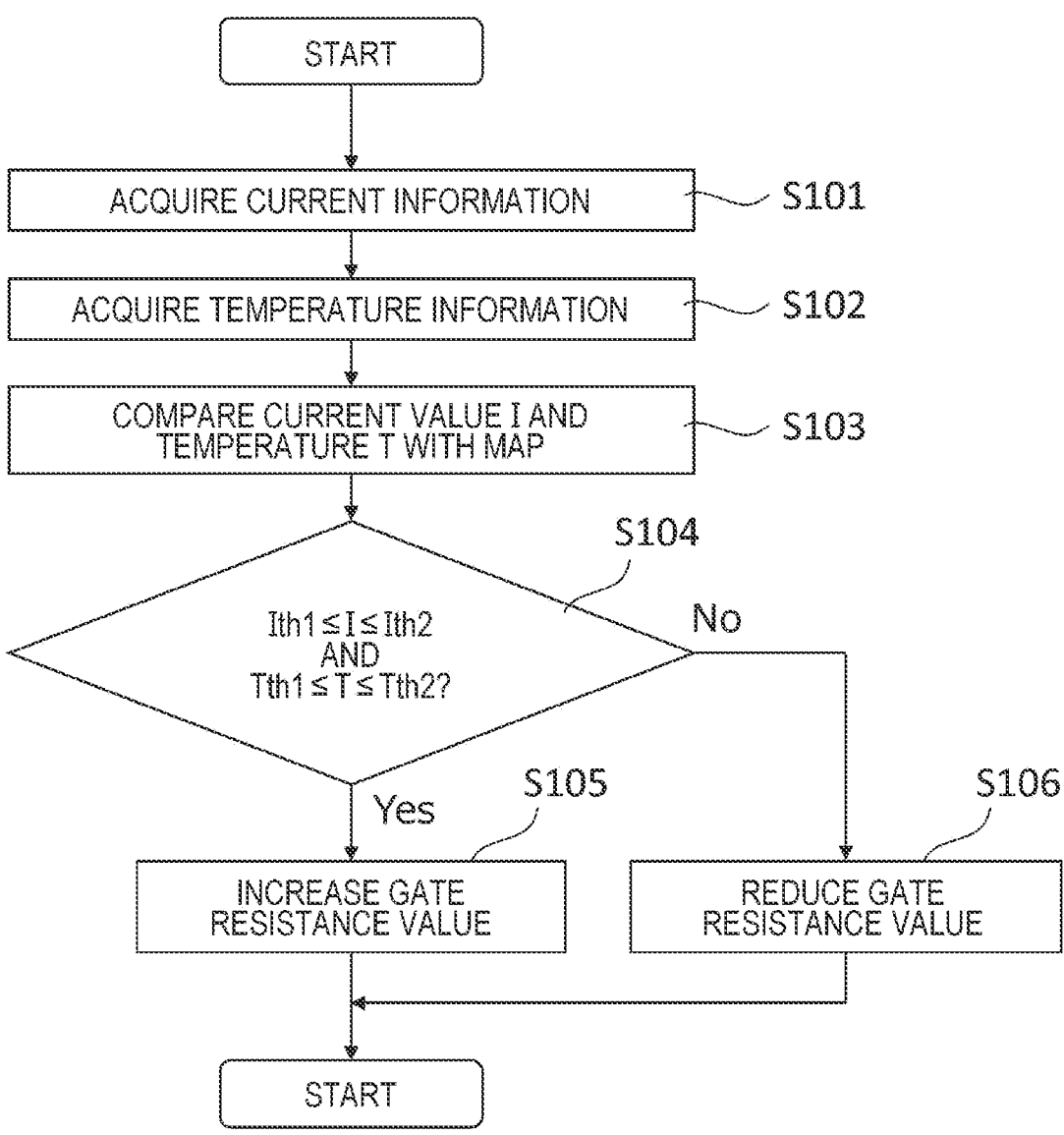
FIG. 7 is a flowchart illustrating processing of generating a gate resistance switching signal according to the embodiment of the present invention.

FIG. 7 is a flowchart illustrating processing of generating the gate resistance switching signal according to the embodiment of the present invention. The processing illustrated in the flowchart of FIG. 7 is executed by the microcomputer 15 in the gate drive circuit 100, for example, at regular processing cycles.

In step S101, the microcomputer 15 acquires the current information 16a.

In step S102, the microcomputer 15 acquires the temperature information 17a.

In step S103, the microcomputer 15 refers to the map 21 stored in the memory 20, and compares the current value I and the temperature T respectively indicated by the current information 16a and the temperature information 17a acquired in steps S101 and S102 with the map 21.

In step S104, the microcomputer 15 determines whether or not the condition that the current value I is equal to or greater than the threshold value Ith1 and equal to or less than the threshold value Ith2 and the temperature T is equal to or greater than the threshold value Tth1 and equal to or less than the threshold value Tth2 is satisfied based on the comparison result in step S103. In a case where this condition is satisfied, that is, in a case where Ith1≤I≤Ith2 and Tth1≤T≤Tth2 are satisfied, the process proceeds from step S104 to step S105, and in a case where the condition is not satisfied, the process proceeds from step S104 to step S106.

In step S105, the microcomputer 15 outputs an instruction to increase the gate resistance value of the IGBT 4 to the driver IC 14. At this time, the microcomputer 15 instructs the driver IC 14 to increase the gate resistance value, for example, by outputting the gate resistance switching signal 15b.

In step S106, the microcomputer 15 outputs an instruction to reduce the gate resistance value of the IGBT 4 to the driver IC 14. At this time, the microcomputer 15 instructs the driver IC 14 to reduce the gate resistance value, for example, by stopping the output of the gate resistance switching signal 15b.

After executing the processing of step S105 or S106, the microcomputer 15 ends the processing shown in the flowchart of FIG. 7.

Next, the difference in the operation of the driver IC 14 depending on the presence or absence of the gate resistance switching signal 15b will be described.

When the gate resistance switching signal 15b is input from the microcomputer 15, the driver IC 14 determines that an instruction to increase the gate resistance value is given by the microcomputer 15. At this time, the driver IC 14 turns on only one of the p-channel MOSFETs 11a and 11b, for example, the p-channel MOSFET 11a, according to the PWM signal 15a. As a result, the gate resistance value at the time of turn-on of the IGBT 4 is set to the resistance value of the gate resistor 7a alone.

On the other hand, when the gate resistance switching signal 15b is not input from the microcomputer 15, the driver IC 14 determines that an instruction to reduce the gate resistance value is given by the microcomputer 15. At this time, the driver IC 14 turns on both the p-channel MOSFETs 11a and 11b according to the PWM signal 15a. As a result, the gate resistance value at the time of turn-on of the IGBT 4 is made less than the resistance value of the single gate resistor 7a alone as the resistance value by the parallel resistance of the gate resistors 7a and 7b.

The gate drive circuit 100 of the present embodiment performs the operation described above. As a result, noise and switching loss in the IGBT 4 and the diode 5 can be suppressed in any current and temperature range.

Figure 8:
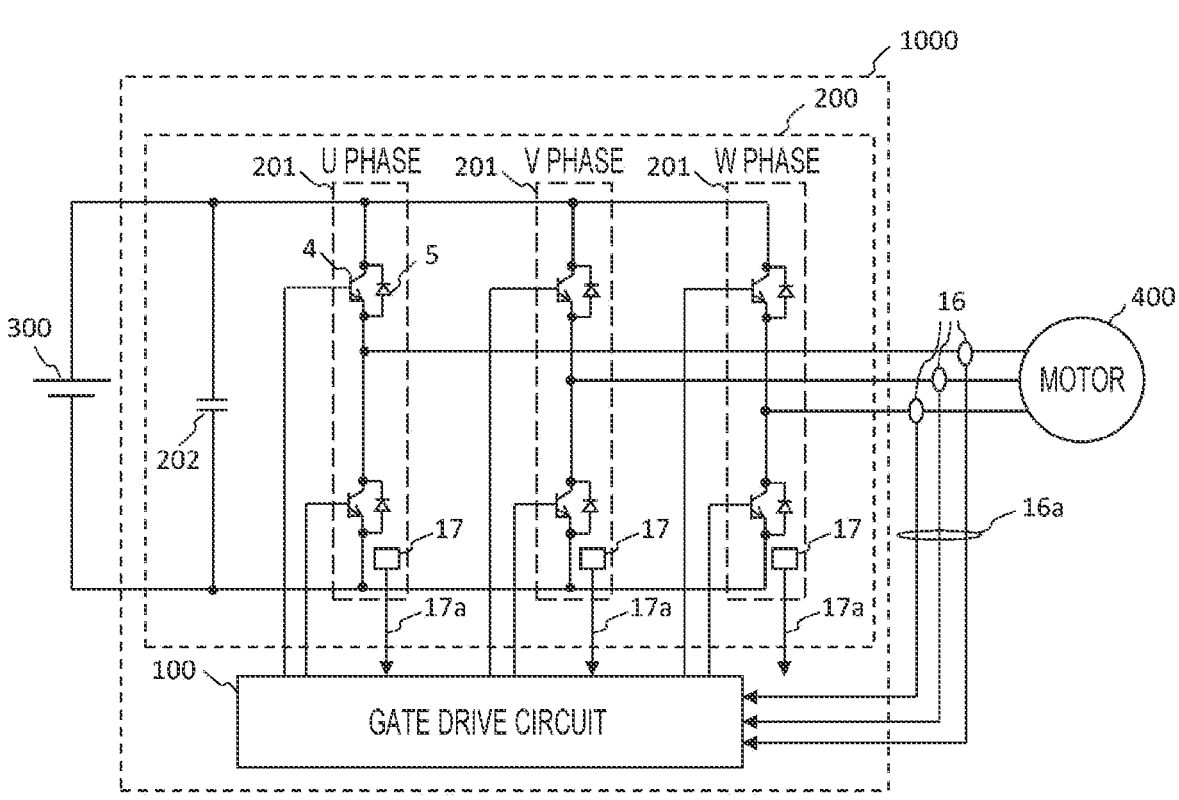
FIG. 8 is a diagram illustrating a configuration of a power conversion device according to the embodiment of the present invention.

FIG. 8 is a diagram illustrating a configuration of a power conversion device according to the embodiment of the present invention. A power conversion device 1000 illustrated in FIG. 8 includes the gate drive circuit 100 and an inverter 200, and is connected to a DC power supply 300 and a motor 400. The gate drive circuit 100 has the circuit configuration described with reference to FIG. 6.

The inverter 200 includes upper and lower arm circuits 201 for the U phase, the V phase, and the W phase of the motor 400. Each of the upper and lower arm circuits 201 has two arms in which the IGBT 4 and the diode 5 are connected in anti-parallel, and these arms are connected in series between the positive electrode and the negative electrode of the DC power supply 300. Each of the output lines to the motor 400 is connected between the emitter of the IGBT 4 constituting the upper arm of each of the upper and lower arm circuits 201 and the collector of the IGBT 4 constituting the lower arm of each of the upper and lower arm circuits 201. The current sensor 16 is provided on the output line, and as described in FIG. 6, the current information 16a output from each current sensor 16 is input to the gate drive circuit 100.

The temperature sensors 17 are installed respectively in each of the upper and lower arm circuits 201 of the inverter 200. Each temperature sensor 17 detects the temperature of the IGBT 4 of each of the upper arm and the lower arm, and outputs the temperature information 17a to the gate drive circuit 100 as described with reference to FIG. 6.

The gate drive circuit 100 is connected to the gate terminal of the IGBT 4 included in each of the upper and lower arm circuits 201 of the inverter 200, converts DC power supplied from the DC power supply 300 into AC power by controlling an on/off state of each IGBT 4, and outputs the AC power to the motor 400. At this time, by performing the above-described operation based on the current information 16a and the temperature information 17a, the gate resistance value at the time of turning on the IGBT 4 included in each of the upper and lower arm circuits 201 of the inverter 200 is switched. As a result, the surge voltage generated in the diode 5 is suppressed, and noise and switching loss in the power conversion device 1000 are reduced.

According to the embodiment of the present invention described above, the following operational effects are obtained.

(1) The gate drive circuit 100 is connected to the IGBT 4, which is a semiconductor element having a gate terminal, via the gate resistors 7a, 7b, and 7c, and changes a gate voltage applied to the gate terminal to drive the IGBT 4. When the condition that the current flowing through the IGBT 4 is equal to or greater than the predetermined threshold value Ith1 and equal to or less than the predetermined threshold value Ith2 greater than Ith1 and the temperature of the IGBT 4 is equal to or greater than the predetermined threshold value Tth1 and equal to or less than the predetermined threshold value Tth2 greater than Tth1 is satisfied, the gate drive circuit 100 switches the resistance value of the gate resistor when the IGBT 4 is turned on to a value greater than that when this condition is not satisfied. In this manner, it is possible to provide the gate drive circuit 100 capable of sufficiently suppressing noise and switching loss generated in the IGBT 4 and the diode 5 which are semiconductor elements.

(2) The gate drive circuit 100 includes the memory 20 in which the map 21 representing the threshold values Ith1, Ith2, Tth1, and Tth2 is stored, and the microcomputer 15 that determines whether the condition is satisfied with reference to the map 21 stored in the memory 20. In this manner, it is possible to reliably and easily determine whether or not the above conditions are satisfied.

(3) The microcomputer 15 acquires the current information 16a indicating the magnitude of the current flowing through the IGBT 4 and the temperature information 17a indicating the temperature of the IGBT 4 (steps S101 and S102), and determines whether or not the condition is satisfied based on the current information 16a and the temperature information 17a (steps S103 and S104). In this manner, it is possible to accurately determine whether or not the above conditions are satisfied according to the state of the IGBT 4.

(4) The gate drive circuit 100 includes the gate power supply 13 that supplies a gate voltage, the gate resistor 7a that is a resistance element connected to the gate terminal of the IGBT 4, the gate resistor 7b that is a resistance element connected to the gate terminal of the IGBT 4 in parallel with the gate resistor 7a, the p-channel MOSFET 11a that switches a connection state between the gate power supply 13 and the gate resistor 7a, and the p-channel MOSFET 11b that switches the connection state between the gate power supply 13 and the gate resistor 7b. The gate drive circuit 100 switches the resistance value of the gate resistance when the IGBT 4 is turned on by changing the switching state of the p-channel MOSFET 11a and the p-channel MOSFET 11b.

Specifically, when the above condition is not satisfied (step S104: No), the IGBT 4 is turned on by turning on both the p-channel MOSFET 11a and the p-channel MOSFET 11b and applying a gate voltage to the gate terminal (step S106). On the other hand, when the above condition is satisfied (step S104: Yes), the p-channel MOSFET 11a is turned on, the p-channel MOSFET 11b is turned off, a gate voltage is applied to the gate terminal, and accordingly, the IGBT 4 is turned on (step S105). With this configuration, the resistance value of the gate resistor when the IGBT 4 is turned on can be reliably and easily switched.

In addition, in the embodiment described above, the current value between the collector and the emitter of the IGBT 4 indicated by the current information 16a is used instead of the current value of the reflux current flowing through the diode 5. The temperature of the IGBT 4 indicated by the temperature information 17a is used instead of the temperature of the diode 5. However, the reflux current flowing through the diode 5 and the temperature of the diode 5 may be directly detected, and the resistance value of the gate resistance when the IGBT 4 is turned on may be changed based on these detection results.

In the above embodiment, the example in which the IGBT is used as the switching element for converting the DC power into the AC power has been described, but another semiconductor element such as a MOSFET may be used. Any semiconductor element can be used as long as a gate terminal is provided and can be driven by changing a gate voltage applied to the gate terminal. When the MOSFET is used, a body diode of the MOSFET can be used as the diode 5.

In the above-described embodiment, an example has been described in which the resistance value of the gate resistor when the IGBT 4 is turned on is changed according to the current and temperature of the IGBT 4 by the gate drive circuit 100 having the circuit configuration illustrated in FIG. 6, but a gate drive circuit having another circuit configuration may be used. For example, a switching element other than the p-channel MOSFETs 11a and 11b may be used to switch the connection state between the gate power supply 13 and the gate resistors 7a and 7b. When the resistance value of the gate resistor when the IGBT 4 is turned on can be changed according to the current and temperature of the IGBT 4, the present invention can be realized using a gate drive circuit having any circuit configuration.

The present invention is not limited to the above-described embodiments, and various modifications can be made without departing from the gist of the present invention.

REFERENCE SIGNS LIST

1 DC power supply
2 wiring parasitic inductance
3 load inductance
4, 4a, 4b IGBT
5, 5a, 5b diode
6 pulse generator
7, 7a, 7b, 7c gate resistor
11a, 11b p-channel MOSFET
12 n-channel MOSFET
13 gate power supply
14 driver IC
15 microcomputer
15a PWM signal
15b gate resistance switching signal

16 current sensor
16*a* current information
17 temperature sensor
17*a* temperature information
20 memory
21 map
100 gate drive circuit
200 inverter
300 DC power supply
400 motor
1000 power conversion device

The invention claimed is:

1. A gate drive circuit that is connected to a semiconductor element having a gate terminal via a gate resistor and changes a gate voltage applied to the gate terminal to drive the semiconductor element, wherein when a condition that (i) a current flowing through the semiconductor element is equal to or greater than a predetermined first threshold value and equal to or less than a predetermined second threshold value greater than the predetermined first threshold value, and (ii) a temperature of the semiconductor element is equal to or greater than a predetermined third threshold value and equal to or less than a predetermined fourth threshold value greater than the predetermined third threshold value is satisfied, a resistance value of the gate resistor when the semiconductor element is turned on is switched to a value greater than that when the condition is not satisfied, wherein the predetermined first threshold value and the predetermined second threshold value correspond to a current range encompassing a current at which a reverse-recovery surge voltage reaches a maximum, and wherein the predetermined third threshold value and the predetermined fourth threshold value correspond to a temperature range encompassing a temperature at which the reverse-recovery surge voltage reaches the maximum.

2. The gate drive circuit according to claim 1, comprising:

a storage unit that stores a map representing the predetermined first threshold value, the predetermined second threshold value, the predetermined third threshold value, and the predetermined fourth threshold value; and a control unit that determines whether or not the condition is satisfied with reference to the map stored in the storage unit.

3. The gate drive circuit according to claim 2, wherein the control unit acquires current information indicating a magnitude of the current flowing through the semiconductor element and temperature information indicating the temperature of the semiconductor element, and determines whether or not the condition is satisfied based on the current information and the temperature information.

4. The gate drive circuit according to claim 1, further comprising:

a gate power supply that supplies the gate voltage;

a first resistance element connected to the gate terminal;

a second resistance element connected to the gate terminal in parallel with the first resistance element;

a first switching element that switches a connection state between the gate power supply and the first resistance element; and a second switching element that switches a connection state between the gate power supply and the second resistance element, wherein the resistance value of the gate resistor is switched by changing a switching state of the first switching element and the second switching element.

5. The gate drive circuit according to claim 4, wherein when the condition is not satisfied, the semiconductor element is turned on by turning on both the first switching element and the second switching element and applying the gate voltage to the gate terminal, and when the condition is satisfied, the semiconductor element is turned on by applying the gate voltage to the gate terminal by turning on the first switching element and turning off the second switching element.

6. A power conversion device comprising:

the gate drive circuit according to claim 1; and an inverter that includes the semiconductor element and converts DC power supplied from a DC power supply into AC power using the semiconductor element.

* * * * *